April 29, 1941. W. R. SMITH 2,240,124
TOY FOR SIMULATING BAGGAGE TRANSFER
Filed Feb. 10, 1940 5 Sheets-Sheet 1

INVENTOR
William R. Smith
BY
ATTORNEY

April 29, 1941.  W. R. SMITH  2,240,124
TOY FOR SIMULATING BAGGAGE TRANSFER
Filed Feb. 10, 1940  5 Sheets-Sheet 2
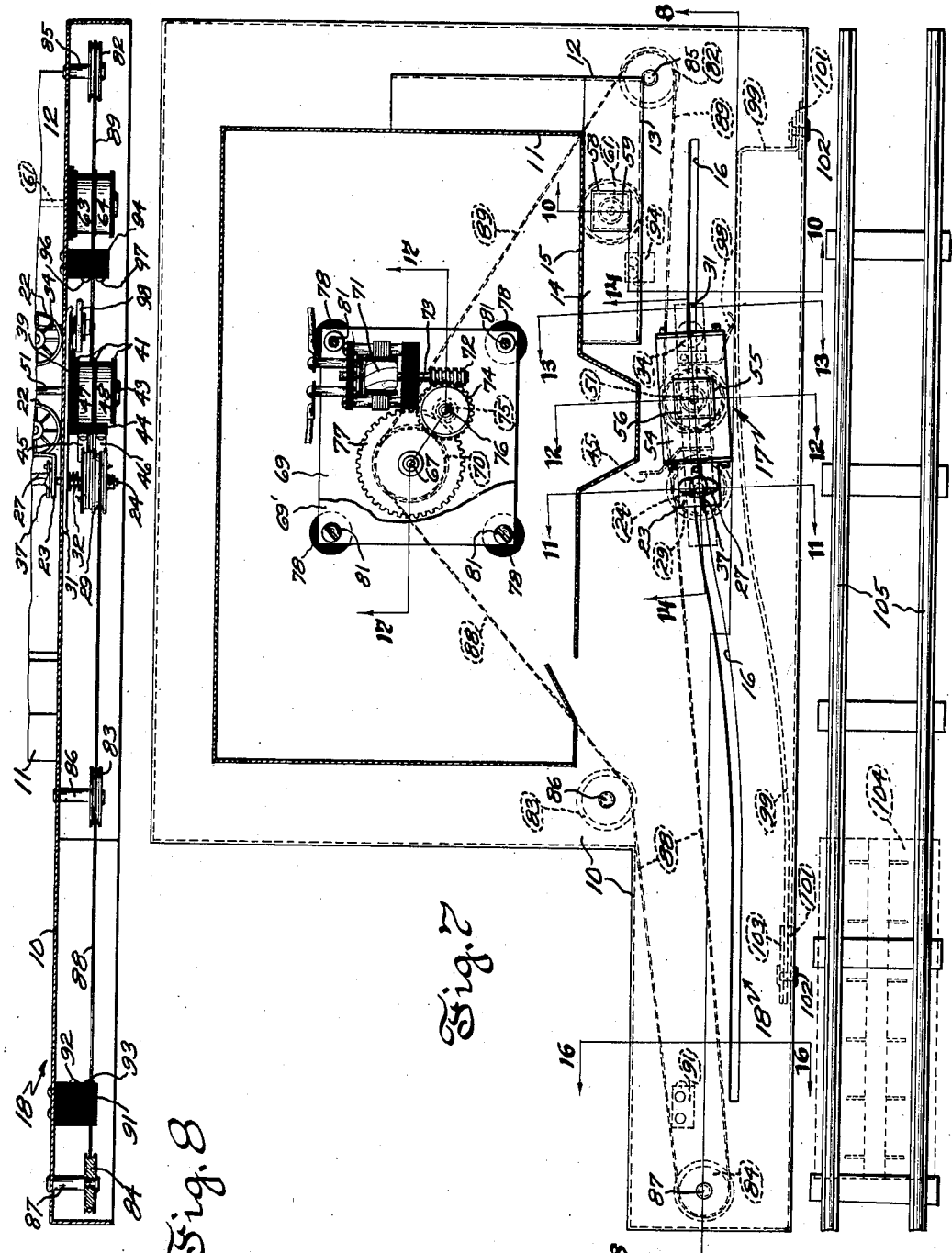
INVENTOR
William R. Smith,
BY
ATTORNEY April 29, 1941.  W. R. SMITH  2,240,124
TOY FOR SIMULATING BAGGAGE TRANSFER
Filed Feb. 10, 1940  5 Sheets-Sheet 3

INVENTOR
William R. Smith,
BY
ATTORNEY

April 29, 1941.  W. R. SMITH  2,240,124
TOY FOR SIMULATING BAGGAGE TRANSFER
Filed Feb. 10, 1940  5 Sheets-Sheet 4

INVENTOR
William R. Smith
BY
ATTORNEY

April 29, 1941.   W. R. SMITH   2,240,124
TOY FOR SIMULATING BAGGAGE TRANSFER
Filed Feb. 10, 1940   5 Sheets-Sheet 5

Fig. 18

INVENTOR
William R. Smith,
BY
ATTORNEY

Patented Apr. 29, 1941

2,240,124

UNITED STATES PATENT OFFICE 2,240,124

TOY FOR SIMULATING BAGGAGE TRANSFER

William R. Smith, Philadelphia, Pa., assignor to The A. C. Gilbert Company, New Haven, Conn., a corporation of Maryland Application February 10, 1940, Serial No. 318,366

16 Claims. (Cl. 46—216)

This invention relates in general to animated toys automatically motivated under electrical control for simulating the activities of men and equipment commonly associated with railway operation, particularly in connection with the loading and unloading of pieces of baggage, express packages, freight boxes or the like at a railway station.

The present improvements aim to simplify and render less costly to manufacture this general type of toy, one embodiment of which is disclosed in my copending application Serial No. 318,365, filed February 10, 1940.

One object of the invention is to avoid the necessity for performing the actual transfer of a loose toy piece of baggage between supports or conveyers therefor by effecting an optical illusion which merely makes the baggage piece appear to be so transferred.

A further object is to produce such optical illusion through the disappearance of one body imitative of a baggage piece and the simultaneous appearance of a like body separated but spaced therefrom and so instantaneously that there is created the illusion of a single article of toy luggage being "transferred" from one place to a neighboring place.

Another object is to effect control of certain circuit connections through the travel of a baggage truck from a loading location to an unloading location, or vice versa, for the purpose of insuring that the appearance and disappearance of the toy baggage bodies shall occur always in proper accordance with the location of a truck which travels to different positions along the platform of a toy railway station.

A still further object is to enable the toy baggage truck automatically to terminate its own travel when it has arrived at a predetermined location on the station platform at which location the illusion of transferring baggage is to be carried out.

These and related objects will become clear from the following description of an embodiment of the improvements, in which description reference is had to the accompanying drawings wherein the arrows on all section planes denote the direction of observation in which the parts are viewed in the correspondingly numbered figure of the drawings.

Fig. 7 is a plan view drawn on a much enlarged scale looking down on the toy station platform and track of Fig. 1 with the roof of the toy station removed to expose parts located therewithin, the baggage truck being shown in a position intermediate its positions in Figs. 2 and 5.

Fig. 8 is a view taken in section through the station platform on the section planes 8—8 in Fig. 7.

Fig. 18 is a diagram of an electrical system for operating the toy by remote control.

Figure 1:
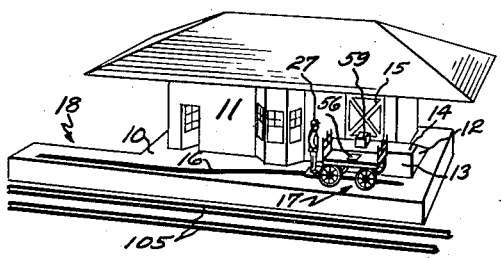
Fig. 1 is a perspective view of a toy railway station having its platform beside a toy railway track and incorporating the present improvements in the form of a baggage truck positioned in front of an elevated landing on which appears an imitative baggage piece.

The structure of the railway station includes a low hollow platform 10 which may be made of sheet metal and carries superimposed thereupon the upright walls of a station house 11. The front wall of the station house is flanked by a hollow raised landing structure 12 having a front wall 13 and a top wall 14, above and at the rear of which appears a door or opening 15 representing an entrance to the baggage room of the station. The station platform 10 has cut out from its floor wall the elongated slot 16 which establishes the path of travel of an animated baggage truck 17 adapted to perform excursions between the raised landing 12 and a track-side terminal location 18 near the end of slot 16.

As best shown in Figs. 7, 11, 12, 13 and 14, truck 17 may be composed of a sheet metal body 19 which includes brackets 20 providing bearings for the axles 21 of the truck wheels 22. The latter ride upon and in electrical contact with the floor wall of platform 10. Downwardly offset from one end of truck body 19, and rigid therewith, there is a support shelf 23 which affords one pivotal bearing for the vertical figure-operating shaft 24 whose top end is rigid with the feet-like pedestal 26 of a toy figure 27 resembling a baggage man. This figure is separately animated in addition to its mere movement with the truck and thereby appears to operate the truck in a manner hereinafter to be explained. Pedestal 26 rotates about the vertical axis of the figure 27 atop a thrust washer 25 which rests on the upper surface of the truck shelf 23. On the lower end of shaft 24 there is fixed by means of pin 28 the hub of a double grooved pulley 29, between which and the bottom surface of the floor wall of platform 10 there is retained one end portion of presser strip 31 which is constantly thrust upward against said floor wall by the coiled compression spring 32 loosely surrounding shaft 24. The other end portion of presser strip 31 is in a like manner thrust upward against the same floor wall by another compression spring 33 loosely coiled about a downward extending guide post 34 rigid with the truck body 19. Spring 33 is retained on the lower end of post 34 by nut 35 which has threaded engagement with the post.

The degree of turning of shaft 24 and the consequent turning of the figure 27 is limited by a horizontal stop pin 37 fast in the figure pedestal 26, opposite ends of which pin engage at different times with a fixed vertical stop pin 38 upstanding from the truck shelf 23. Mounted on the bottom surface of presser strip 31, and depending therefrom, there is a hollow structure composed of insulative material and including a mounting plate 39 and three vertically spaced washers 41 forming flanges of a double magnet spool whose coaxial barrel sections are respectively formed by two collars 42 of insulative material serving as spacers for washers 41. All of these insulative parts are held rigidly together by a central thin walled bushing 33 whose ends are flanged over against the end parts 39, 41 to hold all of the parts together. At the edge of washers 41 the binding post block 44, also of insulative material, is carried in fixed relation thereto. This block carries two laterally extending spring contact fingers 45 and 46 for electrical control purposes hereinafter explained. Washers 41 and collars 42 form in effect adjacent spools respectively accommodating the upper solenoid winding 47 and the lower solenoid winding 48. Vertically and loosely slidable within bushing 43 there is a core plunger 49 having threaded engagement with a vertical stem 51 on whose lower end it is fixed.

Stew 51 passes upward freely through an oversize aperture 52 in the presser strip 31, and freely continues upward through the station platform slot 16, and is provided with a guiding bearing in a bracket member 53 fixed to and depending from the sheet metal body 19 of the truck. The bed 54 of the truck body 19 contains a rectangular aperture occupied by a liftable hollow block 56 which conforms to and has a sliding fit in this aperture and is fixed to the top end of stem 51. Thus parts 56, 51 and 49 reciprocate vertically in unison between an uppermost position shown in Figs. 2, 3, 12 and 14, and a bottom extreme position shown in Fig. 15.

Figure 10:
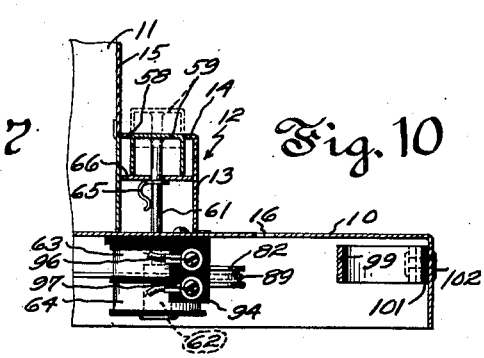
Fig. 10 is a fragmentary view taken in section on the plane 10—10 in Fig. 7.
Figure 12:
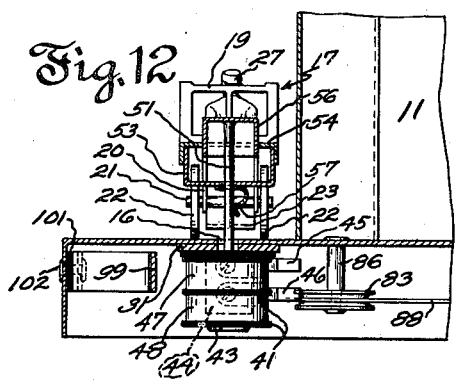
Fig. 12 is a fragmentary view taken in section on the plane 12—12 in Fig. 7.
Figure 11:
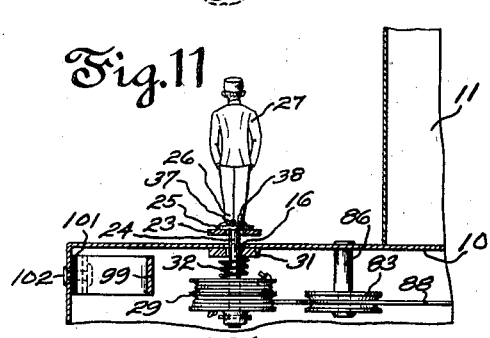
Fig. 11 is a fragmentary view taken in section on the plane 11—11 in Fig. 7.

As best shown in Figs. 7 and 10, the top wall 14 of the hollow baggage landing 12 contains an aperture 58 preferably of the same size and shape as aperture 52 in the truck bed and this aperture 58 is occupied by a hollow block 59 simulating a piece of luggage preferably of the same size, shape and appearance as the baggage simulating block 56. The block 59 is fixed to the top end of a vertical stem 61 which, like stem 51, carries fixedly on its bottom end the core plunger 62. This plunger is vertically slidable from an uppermost position that is more fully within the magnetic field of the upper solenoid coil 63 to a bottom position that is more fully within the magnetic field of a lower solenoid coil 64. The broken line and full line positions of the baggage simulating block 59 in Fig. 10 correspond respectively with the upper and lower positions of core plunger 62, it being understood that solenoid coils 63 and 64 are wound upon a double spool which may be constructed like that shown in Fig. 14 and be composed of parts corresponding to and like insulative washers 41, insulative collars 42, and bushing 43, these parts being rigidly mounted on and depending and insulated from the floor wall of the station platform. A leaf spring 57 is mounted on bracket 53 and bears lightly on stem 51 but with sufficient force to hold up by friction the weight of baggage block 56. A similar leaf spring 65 is mounted on a cross brace 66 under the raised landing 12 and likewise bears lightly on stem 61 but with sufficient force to hold up by friction the weight of baggage block 59. Bracket 53 and cross brace 66 serve as downward stops for their respective baggage blocks.

On the platform 10 within station house 11 is mounted the base 69 of a power plant unit which includes the electric motor 71 and a train of reduction gears consisting of a worm 72 fast on the motor shaft 73, a worm wheel 74 meshing with worm 72, a pinion 75 fixed to the same shaft 76 as is worm wheel 74, and a large spur gear 77 fast to the vertical shaft 67. Both shafts 67 and 73 are journaled in the frame plates 69 and 69'. Shaft 67 projects downward through the floor wall of platform 10 and carries fixed to it therebelow the pulley 70. To prevent transmission of noisy vibration from the power unit to any sheet metal structure of the station platform, washers 78 of suitably soft material may be interposed between the base 69 of the power unit and the platform structure as well as between the platform structure and the holding nuts 79 which have threaded engagement with the fastening bolts 81 for securing the power unit and thereby stationing pulley 29 in relation to the platform.

Figure 9:
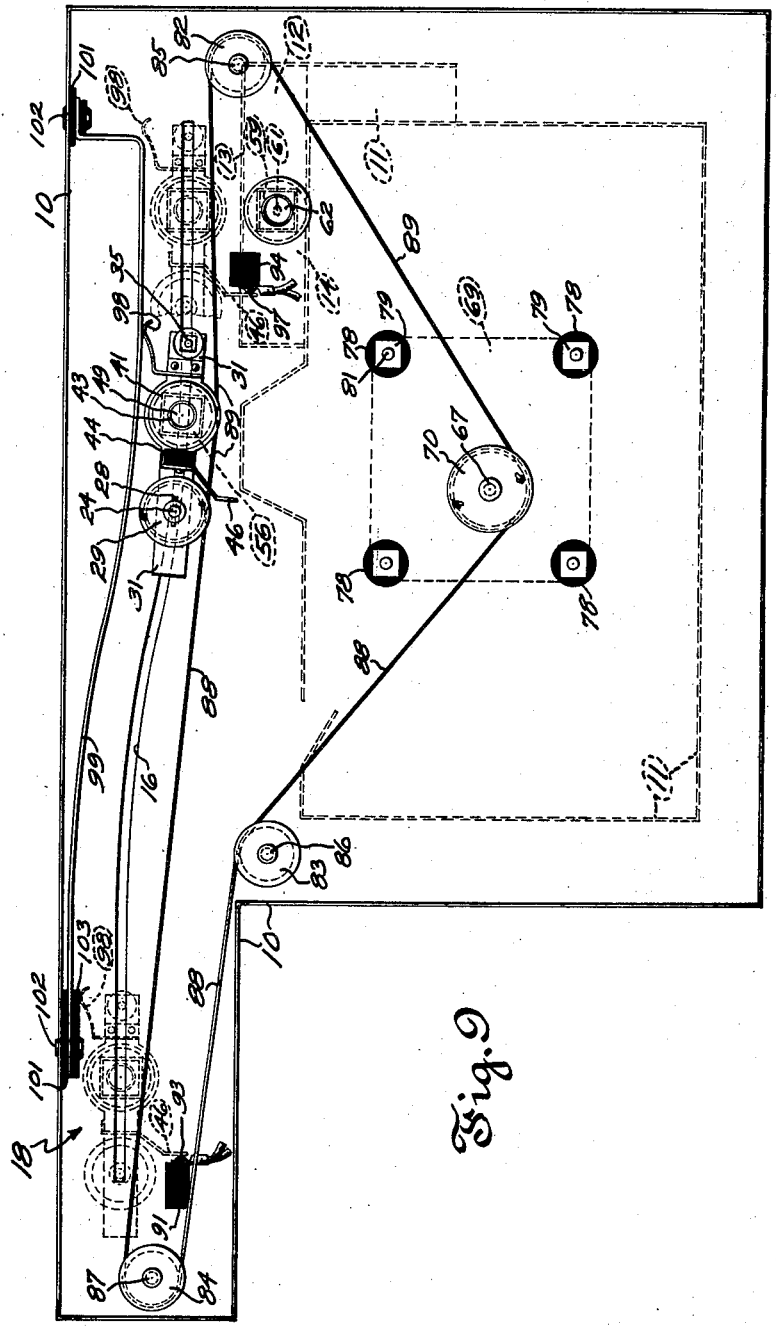
Fig. 9 is a bottom plan view of the station platform.
Figure 17:
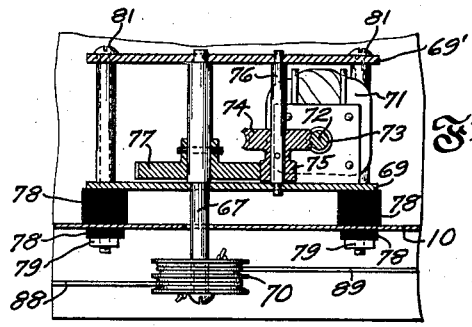
Fig. 17 is a fragmentary view taken in section on the plane 17—17 in Fig. 7.

Also mounted in fixed positions on the station platform beneath the floor wall of same there are three freely rotatable guide pulleys 82, 83 and 84, best shown in Fig. 9. These pulleys are retained in a manner to rotate freely on studs 85, 86 and 87, respectively, each of which studs is rigid with and projects downward from the station platform. A continuous flexible draft cord 88 at one of its ends winds and unwinds about the lower groove in pulley 29 and is attached thereto, and at its other end winds and unwinds about the lower groove in pulley 70 and is attached thereto. Cord 88 bears against idler pulley 83 and extends around and bears on guide pulley 84. A similar draft cord 89 at one of its ends winds and unwinds about the upper groove in pulley 29 and is attached thereto and at its opposite end winds and unwinds about the upper groove in pulley 70 and is attached thereto. Cord 89 extends around and bears on pulley 82.

Figure 16:
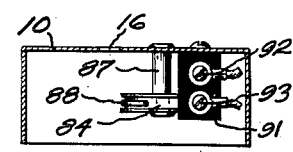
Fig. 16 is a view taken in section on the plane 16—16 in Fig. 7.
Figure 13:
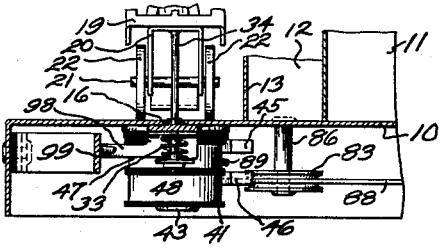
Fig. 13 is a fragmentary view taken in section on the plane 13—13 in Fig. 7.

Fixed to and depending from the floor wall of the station platform 10 near terminal 18 of the platform slot 16, as best shown in Figs. 8 and 16, there is mounted a terminal block 91 of insulative material which carries two contact points 92 and 93 insulated from each other and from the metallic structure of the station platform and so located and spaced apart as to be engaged upon suitable occasion by contact fingers 45 and 46, respectively, when the baggage truck 17 has completed its travel in one direction. Beneath the raised landing 12, and likewise fixed to and depending from the floor wall of the station platform, there is a similar insulative terminal block 94 carrying two insulated contact points 96 and 97 located and spaced to be engaged respectively by contact fingers 45 and 46 when the baggage truck has completed its travel in the other direction. Truck 17 further carries a laterally projecting metallic spring finger or trolley shoe 98 which as the truck rolls along the station platform wipes conductively against the conductive trolley rail 99, the latter being supported at its ends upon the inner surface of the front edge wall of the station platform 10 and insulated therefrom by non-conductive spacers 101 penetrated by insulated fastening eyelets 102. Overlapping that surface of rail 99 which is wiped by trolley 98, there is a facing 103 of insulative material interposed in the path of the trolley when the baggage truck occupies its position at the track-side terminal 18. The trolley rail 99 falls short of reaching to the position of trolley 98 when the truck is at its opposite limit of travel in front of the raised landing 12 for purposes which will later appear.

104 represents the baggage car of a toy train that may be hauled by electrical power or otherwise into a position in front of the toy station along rails 105 of any toy railway track system. The coming and going of such car will be coordinated with the movements of baggage truck 17 in such way as to assist the illusion of appearing to load baggage into this car or to unload baggage therefrom.

An illustrative example of how the toy may be operated to produce the illusion of transferring, loading and unloading baggage is given in the following, it being understood that the sequence of the operations may be varied within limits at the will of the operator.

In the position of parts shown in Fig. 1, the baggage simulating block 59 is elevated into view above the raised landing 12 in front of the baggage room door 15 while the similar block 56 is apparently absent since only its top face can be seen flush with the bed surface of the baggage truck 17 and it therefore appears to comprise merely a part of such bed surface. The figure of the baggage man is turned to face his empty stationary truck.

The toy is animated by electrically energizing in predetermined relation the windings 47, 48, 63 or 64 of certain magnets for actuating the baggage simulating blocks 56, 59, and by energizing, to run in one direction or the other, the station contained motor 71 which motivates the baggage truck. Such electrical effects may be controlled from a remote point by any suitable form of circuit shifter, there being shown diagrammatically in Fig. 18 for example the selector switch 162 having the conductive distributor arm 165 which swings upon and in electrical contact with its pivot 169 which is permanently in electrical connection with one secondary terminal 170 of the power supply toy transformer so marked in Fig. 18, the other secondary terminal 171 of which connects with the ground as at 172 in Fig. 18. All grounding points denoted in Fig. 18 as 166, 167, 168 and 172 are understood to be in constant electrical communication with one another through various structural parts of the toy made of electrically conductive materials. The tail portion 173 of arm 165 is of nonconductive material and serves to insulate as well as to carry the contact bridging conductive plate 174 which is capable at different times of bridging stationary contacts GH or IJ. Various other stationary contacts of selector switch 162 are designated A, B, C, D, E, F and A'. The field coil of reversing motor 71 appears at W while a self opening momentary contact switch S may be located at the same station as selector switch 162 for manual or mechanically connected actuation in conjunction therewith in a sequence which may be either selective or predetermined.

Figure 2:
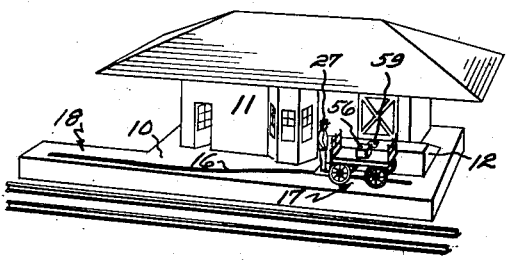
Fig. 2 is a like view with the imitative baggage piece appearing on the truck instead of on the elevated landing.
Figure 3:
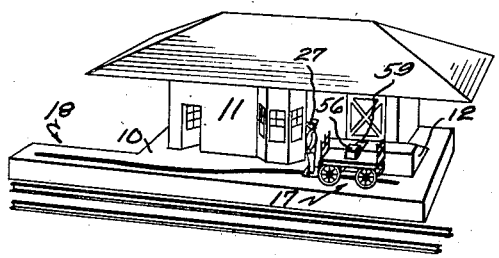
Fig. 3 is a similar view in which the figure of the baggage man has turned to face away from the truck.
Figure 14:
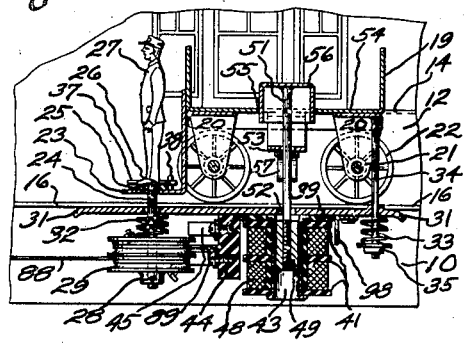
Fig. 14 is a fragmentary view taken in section on the plane 14—14 in Fig. 7.
Figure 15:
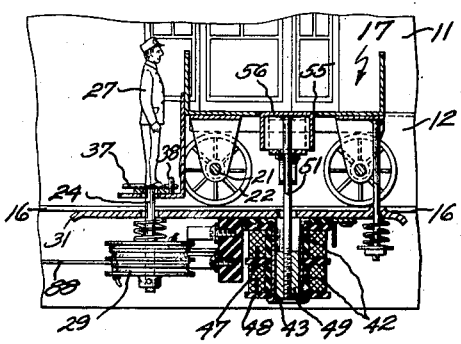
Fig. 15 is a view like Fig. 14 showing the baggage man turned about to face his truck and showing the truck carried baggage body lowered to a position to be invisible above the truck frame.

Through the electrical instrumentalities enumerated, we may start the action of the toy. As positioned when in contact with "A" in Fig. 18, distributor arm 165 establishes the circuit 170—169—165—A—(97—46—48—167) or (63—168)—172—171 attracting core plunger 62 upward and core plunger 49 downward. All other circuits are dead ended at selector switch 162. The operator may first shift distributor arm from A to B. This energizes circuits 170—169—165—B—(96—45—47—167) or (64—168)—172—171 attracting core plunger 62 downward and core plunger 49 upward. Until either of core plungers 62 and 49 is magnetically attracted downward by solenoid coils 64 or 48, each plunger is held up against gravity and in topmost position by the light friction of leaf spring 57 or 65. Thereby, instantaneously and simultaneously, baggage simulating block 59 is made to disappear from its position above landing 12 and block 56 is made to appear above the bed of the truck. This electrically performed transition takes place more quickly than can be followed by the eye so that the optical illusion is created that a toy piece of baggage has actually been transferred from the raised landing to the truck. This new position of parts is shown in Figs. 2 and 14.

Having thus "transferred" the baggage piece from the landing to the truck, the operator may shift distributor 165 to contact C, whereupon the winding W of motor 71 is thrown into such circuit relation to the motor brushes that when switch S is momentarily closed, motor 71 starts to run and rotates pulley 70 clockwise in Fig. 7 (counterclockwise in Fig. 9) thus reeling up on cord 89 while playing off a corresponding length of cord 88. This first acts to rotate the truck carried pulley 29 counterclockwise in Fig. 7 (clockwise in Fig. 9) as the latter is caused to play off said cord 89 and reels up a corresponding length of cord 88 and thereby the baggage man figure 27 is rotated approximately a half turn on its vertical axis until the opposite end of its horizontal stop pin 37 engages vertical stop pin 38. This brings the parts to the position shown in Fig. 3.

As the stop pins now prevent further rotation of the truck carried pulley 29, continued rotation of pulley 70 under the power of motor 71 causes cord 89 to pull truck 17 bodily away from in front of raised landing 12 along platform slot 16 to the terminal location 18. At the beginning of this travel of the truck, trolley 98 rides into wiping engagement with trolley rail 99 which completes circuit 170—71—G—174—H—W—99—98—166—172—171 enabling motor 71 to continue running even when switch S is released and allowed to reopen. Also in this travel of the truck, contact fingers 45, 46 depart from contacts 96, 97 and travel toward and finally into engagement with contacts 92 and 93, respectively. At about this time trolley 98 wipes onto the insulative facing 103 of trolley rail 99 and current to motor 71 is thereby cut off, truck 17 thus automatically terminating its own journey at the track-side terminal 18.

Figure 4:
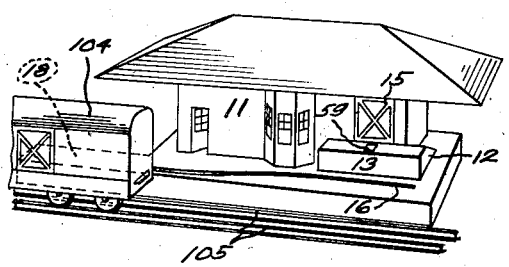
Fig. 4 shows a portion of the car of a toy train arrived on the track rails in front of the station at a point to obscure the baggage truck which has traveled to a position on the station platform concealed by the car.

Either before or after the loaded baggage truck arrives at terminal 18, the toy baggage car 104, or a toy train containing such car, may be run up in front of the station preferably to a position concealing the loaded baggage truck at terminal 18 as shown in Fig. 4.

Figure 5:
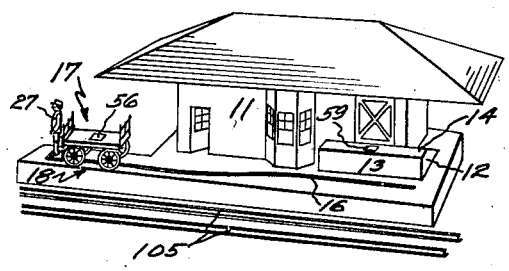
Fig. 5 is a similar view showing the baggage truck exposed and empty of baggage when the train has drawn away from the station.

At this time distributor 165 may be shifted to contact D which will complete circuit 170—169—165—D—93—46—48—167—172—171. Core 49 is thus magnetically attracted downward and the entire projecting body of baggage block 56 is made to disappear beneath the bed 54 of the truck. Consequently when the baggage car or its train pulls away from in front of the station there results the strong visual impression that the "baggage" has actually been loaded into the car of the train, truck 17 then appearing as in Fig. 5.

A second car or train may now be run up in front of the station and while it conceals the truck as in Fig. 4, distributor 165 may be shifted to contact E establishing circuit through upper magnet solenoid 47 thus again lifting the "baggage" into view above the truck bed. This, when the train departs, presents the effect of the truck having been loaded with baggage discharged by the train.

By now shifting distributor to contact F, the field connections of motor 71 are conditioned to cause the motor to run in a direction opposite to that in which it last ran, the arm terminal 174 now bridging contacts J and I instead of G and H. Momentary closing of switch S will by reverse rotation of pulleys 70 and 29 first cause the baggage man figure 27 to turn and face his truck after which the engagement of stop pins 37 and 38 and the continued pull of cord 88 will cause the "loaded" truck to travel from unloading terminal location 18 back to in front of the raised landing 12, which latter is found to be devoid of "baggage." The motor continues running by means of current collected from rail 99 by trolley 98 so that the starting switch may be manually released and permitted to open. The motor current is finally cut off when trolley 98 runs off from the right end of rail 99 in Fig. 18 and breaks contact therewith. The position of parts is now again as in Fig. 2. Obviously the shifting of distributor from contact F to contact A' will restore all parts to their positions in Fig. 1 and a cycle of apparent loading and unloading action has been completed under manual step-by-step control which could if desired be effected sequentially and automatically instead of manually, using any suitable form of sequence relay or motor driven drum type of electrical controller. The illusion is as equally effective whether the "baggage" is transferred from the landing to the truck or from the truck to the landing and whether the "baggage" is "loaded" or "unloaded" from the railway car in the manner described.

Figure 6:
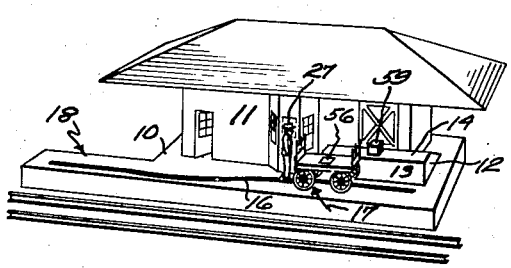
Fig. 6 is a similar view showing the baggage man again facing his empty truck which has now returned nearly to its original position.

Fig. 6 shows the possibility of having "baggage" on the raised landing when the truck approaches same empty, it being clear from the electrical system of Fig. 18 that solenoid 63 can be energized at any time to lift baggage block 59 by merely placing the distributor 165 on contact A or A' regardless of the position of the truck. The truck carried solenoids, however, can only be energized when the truck is at or near the limits of its run thereby to insure the effect of illusion by preventing up or down movements of baggage block 56 while the parts of the toy are improperly related to create the visual effect of illusion of transferring baggage which is desired.

The invention may be embodied in forms of toy apparatus differing from the exact parts herein disclosed and many modifications of the latter may be resorted to within the intended scope of the appended claims. For example, the raised landing 12, or some equivalent therefor, may be located as close to the railroad track as is the truck 17 when at track-side location 18 so that an article of baggage can appear to be loaded directly from the raised landing into the railway car or vice versa without resorting to the intermediary performance of the baggage truck 17. Parts other than the baggage truck may at will be eliminated from the toy, the completeness of which as herein disclosed is illustrative of a full and logical series of loading and unloading performances characteristic of actual activities at a real railway station. The remote control switch 162 may take the form of a drum type of step-by-step circuit controller operated by repeatedly depressing a single push-button or control handle operating a ratchet pawl drive in well understood manner. The circuits may be varied in many ways from those shown in Fig. 18 and the railroad track may consist of only two traction rails or may comprise a three-rail system involving the "third" or power rail as herein employed. The following claims will therefore be understood to include in their intended scope all equivalents and substitutes for the particular parts of the apparatus herein illustrated which might be suggested to workers in this art by the disclosure hereof.

Although there is not claimed herein the construction and operative features of the toy station truck and its figure attendant apart from particular electrical control circuits and the construction and operative features of the imitative baggage piece, such truck, figure and associated mechanisms are claimed per se in my hereinbefore mentioned copending application.

I claim:

1. In an animated toy, in combination, a toy railway station, a movable body imitative of a baggage piece or the like, a structure associated with said station comprising a support presenting a raised top surface on which said baggage-like body appears to rest, and means permitting said body to descend through said top surface, thereby to cease to upstand therefrom and seemingly disappear.

2. In an animated toy, in combination, a toy railway station, a movable body imitative of a baggage piece or the like, a structure associated with said station comprising a support presenting a raised top surface on which said baggage-like body appears to rest, said top surface having an aperture of suitable size and shape to permit the descent of said body therethrough and arranged to be concealed by the lower portion of said body before the latter descends therethrough.

3. In an animated toy, in combination, a toy railway station, a movable body imitative of a baggage piece or the like, a structure associated with said station comprising a support presenting a raised top surface on which said baggage-like body appears to rest, said top surface having an aperture of suitable size and shape to permit the descent of said body therethrough and arranged to be concealed by the lower portion of said body before the latter descends therethrough, and means to limit the descent of said body when the latter is so positioned that its top face lies flush with said section surface.

4. In an animated toy for producing the optical illusion of transferring toy baggage from one to the other of side-by-side seeming supports therefor, the combination of a toy railway station, two movable bodies of like appearance each imitative of a baggage piece or the like, side-by-side structures associated with said railway station presenting raised adjacent top surfaces surrounding said bodies respectively and constituting said seeming supports, means operative to shift one of said bodies from a position upstanding from one of said top surfaces to a position flush therewith, and means operative simultaneously to shift the other of said bodies from a position flush with the other of said top surfaces to a position upstanding therefrom, said simultaneous shifting of said bodies occurring with sufficient speed to confuse the eye as to the actual direction in which each of said bodies moves.

5. In an animated toy as defined in claim 4, the combination defined in said claim, together with a toy wheeled vehicle resembling a baggage conveying station truck carrying one of the said adjacent seeming support surfaces and one of the said baggage imitative bodies.

6. In an animated toy as defined in claim 4, the combination defined in said claim, in which each of the said means to shift each of the said baggage imitative bodies comprises an electromagnetic motivator.

7. In an animated toy as defined in claim 4, the combination defined in said claim, in which each of the said means to shift each of the said baggage imitative bodies comprises a pair of upper and lower coaxial solenoid coils positioned end-to-end, together with electric circuits so connecting said solenoid coils that the upper coil of either pair may be energized at the same time that the lower coil of the other pair is energized, together with a core plunger connected to each of said bodies and reciprocative between the magnetic fields of said upper and lower solenoid coils of each said pair.

8. In an animated toy as defined in claim 4, the combination defined in said claim, in which each of the said means to shift each of the said baggage imitative bodies comprises a pair of upper and lower coaxial solenoid coils positioned end-to-end, together with a core plunger connected to each of said bodies and reciprocative between the magnetic fields of said upper and lower solenoids of each said pair, a toy wheeled vehicle representing a baggage conveying station truck carrying in its travel relative to said station one of the said baggage imitative bodies with its said seeming support surface and one of said pairs of solenoid coils, electric circuit making and breaking devices in part riding with said truck and in part fixed on the said toy railway station, and electric circuits containing said solenoid coils and said devices so connected that when said vehicle is in predetermined position relative to said station the upper solenoid coil of one of said pairs is energized simultaneously with the lower solenoid coil of the other pair.

9. In an animated toy as defined in claim 4, the combination defined in said claim, in which each of the said means to shift each of the said baggage imitative bodies comprises a pair of upper and lower coaxial solenoid coils positioned end-to-end, a toy wheeled vehicle representing a baggage conveying station truck carrying in its travel relative to said station one of the said baggage imitative bodies with its said seeming support surface and one of said pairs of solenoid coils, electric terminals carried by said vehicle connected with each of said vehicle carried solenoid coils, contacts mounted at one location on the structure of said station in position to be engaged by said terminals when the latter arrive with said vehicle at said location, other contacts mounted at a spaced location on the structure of said station in position to be engaged by said terminals when the latter arrive with said vehicle at said spaced location, and separately energizable circuits for rendering alive selected ones of said contacts thereby to energize selective ones of said vehicle carried solenoid coils when the vehicle is at either of said locations.

10. An optical illusion toy for simulating the action of transferring baggage at a railway station, including in combination, a toy railway station having a raised baggage landing, a toy track extending alongside said station, a toy railway car on said track, a toy baggage truck adapted to perform excursions between said car and said raised landing, a movable baggage simulating body electrically operable mechanism, constructed and arranged to cause said body to appear on and disappear from the bed of said truck, a second and like baggage simulating body, electrically operable apparatus constructed and arranged to cause said second body to appear on and disappear from the surface of said raised landing, and remote control means electrically connected to energize and deenergize said mechanism and apparatus in predetermined sequence in a manner to cause either of said bodies to appear and the other body to disappear instantly and simultaneously when said truck is closely adjacent said raised landing.

11. In an animated toy for imitating the transfer of baggage at a railroad station, the combination of the floor of a station platform, a toy baggage carrying truck constructed and arranged to perform limited travel back and forth on said platform floor, an electrically powered prime mover mounted in fixed relation to said floor, a flexible cable extending between said truck and said prime mover to enable the latter to impel the former, an electric circuit containing said prime mover, and means to make and break said circuit consisting of a power rail extending along the path of travel of said truck and a trolley carried by said truck in wiping engagement at times with said power rail.

12. In an animated toy as defined in claim 11, the combination defined in said claim, in which the said parts are so related that the said truck-carried trolley rides with said truck to a limit position of the latter wherein said trolley passes out of contact with the said power rail, thereby to deenergize the said truck-impelling prime mover.

13. In an animated toy as defined in claim 11, the combination defined in said claim in which the said parts are so related that the said truck-carried trolley rides with said truck to opposite extreme positions of the travel thereof in each of which extreme positions said trolley passes out of contact with the said power rail, thereby to deenergize the said truck-impelling prime mover.

14. In an animated toy as defined in claim 11, the combination defined in said claim in which the said parts are so related that the said truck-carried trolley rides with said truck to a limit position of the latter wherein said trolley passes out of contact with the said power rail thereby to deenergize the circuit containing said truck-impelling prime mover, together with a momentary contact switch manually operable at a point remote from said station and electrically connected to remake the circuit broken by the separation of said trolley from said power rail.

15. In an animated toy as defined in claim 11, the combination defined in said claim, in which the said prime mover comprises an electrically reversible motor and in which the said truck-carried trolley and the said power rail are so related that said trolley rides with said truck to a limit position of the latter wherein said trolley passes out of contact with the said power rail thereby to deenergize the circuit containing said prime mover, together with a circuit switching electric controller manually operable at a point remote from said station and electrically connected to energize said motor and cause it to run in the opposite direction while said trolley is separated from said power rail.

16. An optical illusion toy for simulating the action of transferring baggage at a railway station, including in combination with a toy railway station, a toy baggage landing, a toy baggage truck, a movable baggage simulating body mechanically associated with said landing, electrically operable mechanism constructed and arranged to cause said body to appear on and disappear from said landing, a second and like baggage simulating body mechanically associated with said truck, electrically operable apparatus constructed and arranged to cause said second body to appear on and disappear from said truck, and control means to predetermine and coordinate simultaneous performance of said mechanism and apparatus.

WILLIAM R. SMITH.